No. 827,686. PATENTED JULY 31, 1906.
R. W. DAVIES.
WIRE GLASS MACHINE.
APPLICATION FILED OCT. 10, 1905.

3 SHEETS—SHEET 1.

WITNESSES.

INVENTOR.

No. 827,686. PATENTED JULY 31, 1906.
R. W. DAVIES.
WIRE GLASS MACHINE.
APPLICATION FILED OCT. 10, 1905.
3 SHEETS—SHEET 2.
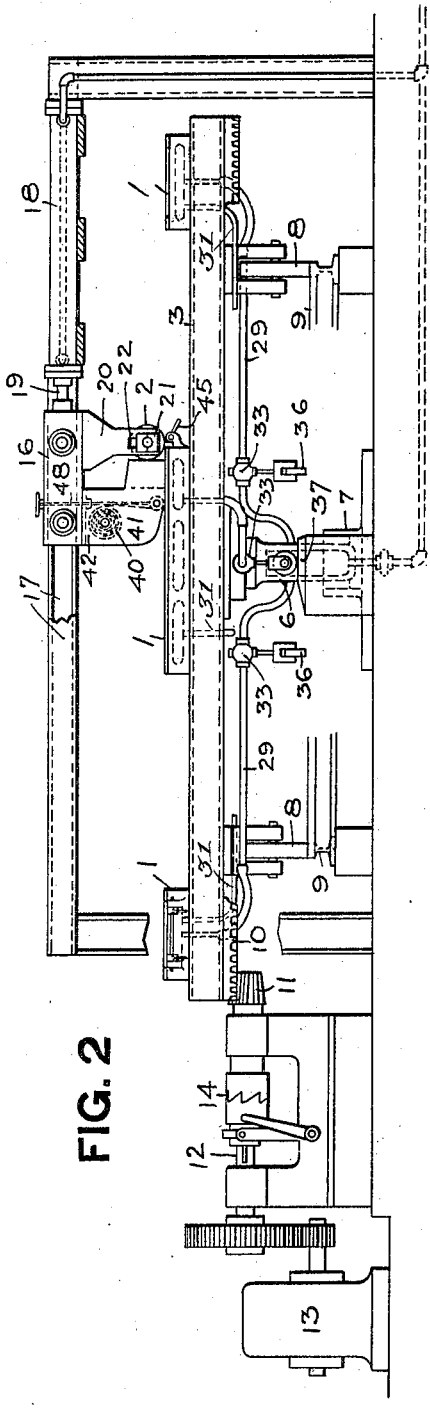
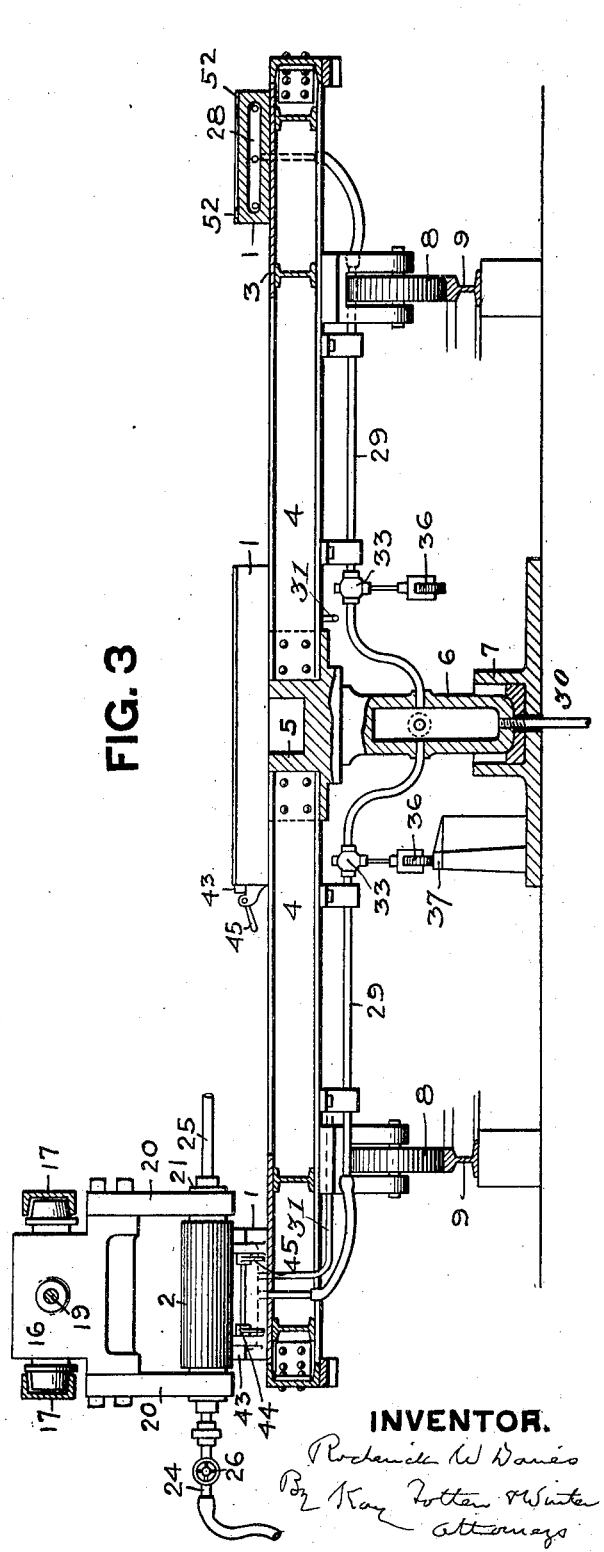
WITNESSES.
INVENTOR.

No. 827,686. PATENTED JULY 31, 1906.
R. W. DAVIES.
WIRE GLASS MACHINE.
APPLICATION FILED OCT. 10, 1905.

3 SHEETS—SHEET 3.

WITNESSES.
J. R. Keller
Robert C. Totten

INVENTOR.
Roderick W. Davies
By Kay Totten & White
attorneys

UNITED STATES PATENT OFFICE.

RODERICK W. DAVIES, OF AVONMORE, PENNSYLVANIA, ASSIGNOR TO SERGEANT GLASS COMPANY, OF WILLIAMSPORT, PENNSYLVANIA, A CORPORATION OF PENNSYLVANIA.

WIRE-GLASS MACHINE.

No. 827,686.        Specification of Letters Patent.        Patented July 31, 1906.

Application filed October 10, 1905. Serial No. 282,183.

*To all whom it may concern:*

Be it known that I, RODERICK W. DAVIES, a resident of Avonmore, in the county of Westmoreland and State of Pennsylvania, have invented a new and useful Improvement in Wire-Glass Machines; and I do hereby declare the following to be a full, clear, and exact description thereof.

My invention relates to a machine for making rolled sheet glass, such as plate-glass, ribbed glass, prism-glass, and the like.

The object of the invention is to provide a machine whereby the manufacture of such glass is greatly expedited and facilitated, so as to increase the output and cheapen the product.

The invention consists, generally stated, in providing a series of tables upon which the glass is formed and having said tables mounted upon a carrier which will carry the same in succession to the pressure roller or rollers which form the glass on the table, said platform being intermittently driven, so that the tables are held stationary while pressure-rollers form the glass thereon.

The invention also consists in certain details of construction, such as means for applying wire-trellis when making wire-glass, means for adjusting the same, means for cooling the tables, and other details which will be hereinafter described and claimed.

Figure 1:
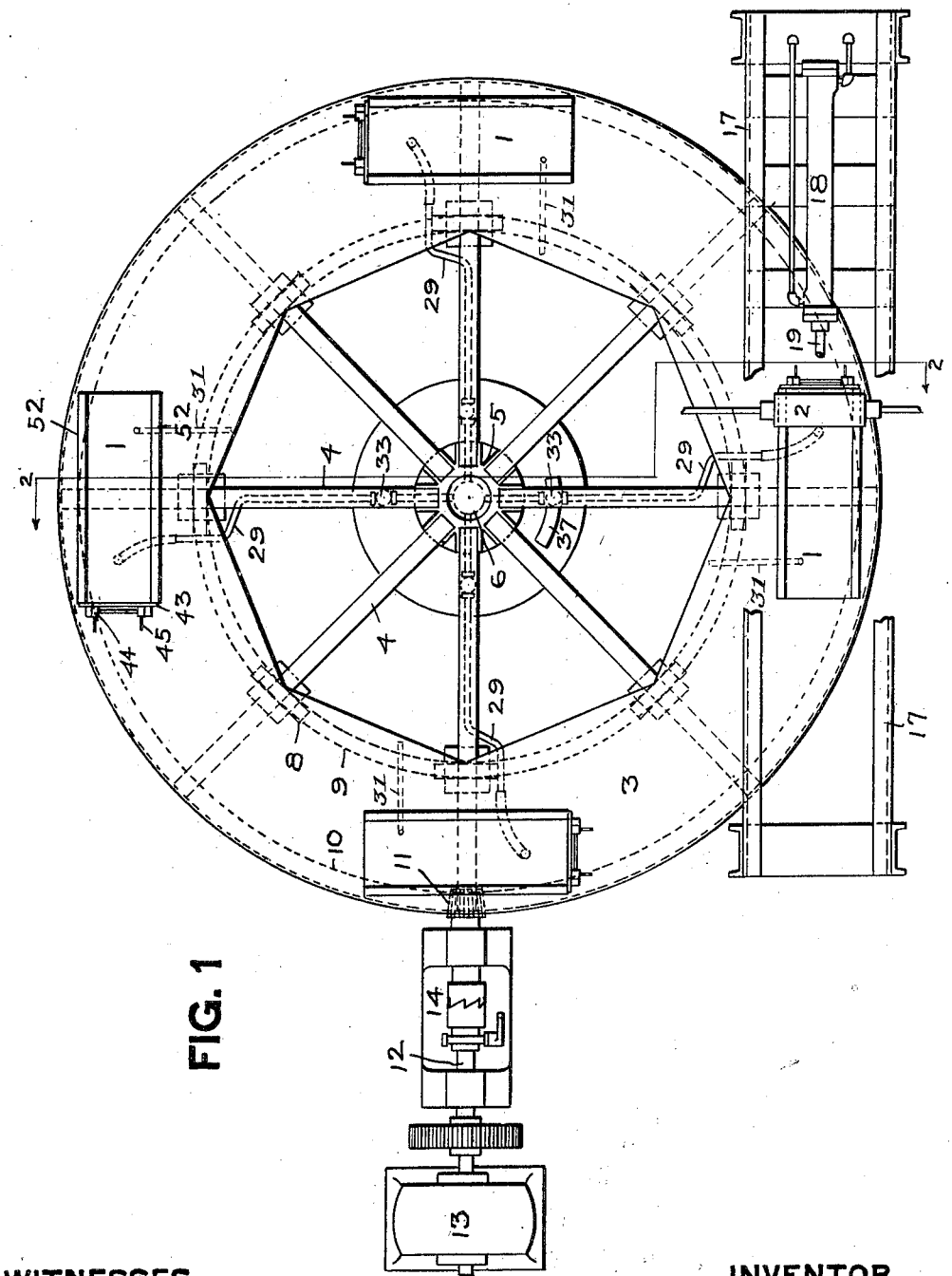
Figure 4:
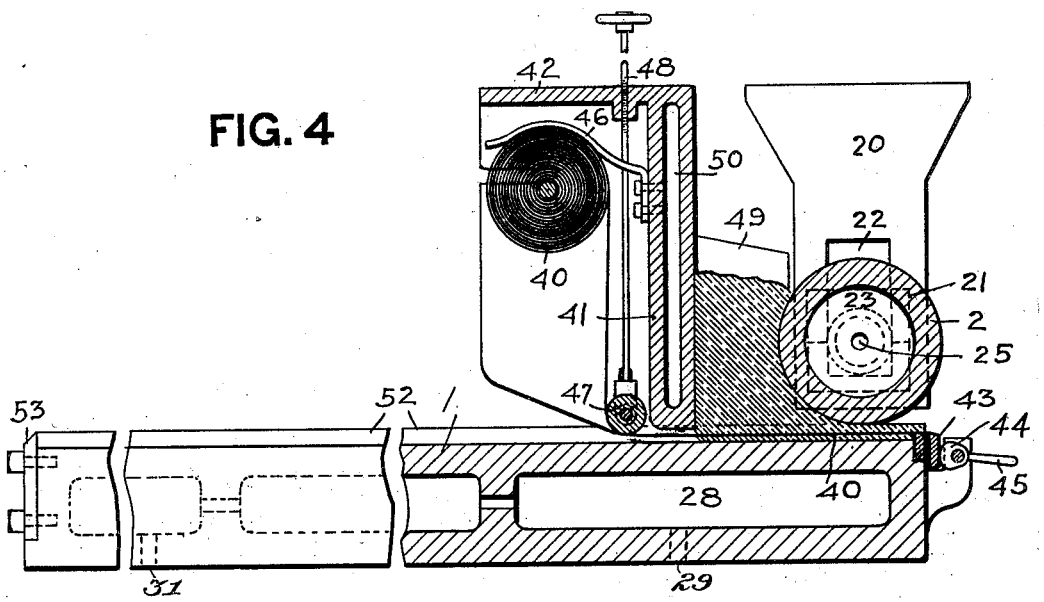
Figure 5:
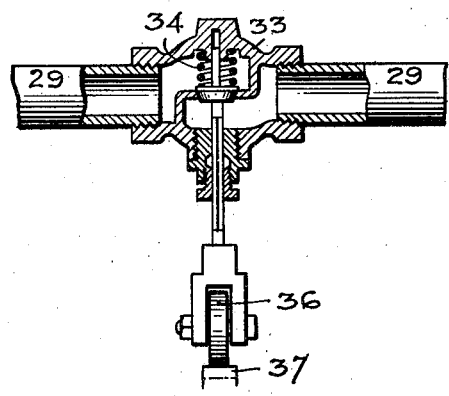
Figure 6:
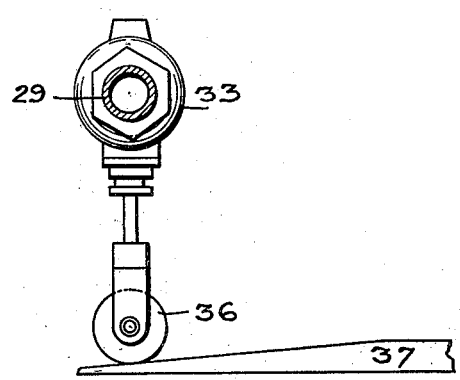

In the accompanying drawings, Figure 1 is a plan view of my improved machine. Fig. 2 is a side elevation thereof. Fig. 3 is a section on the line 2 2, Fig. 1. Fig. 4 is a vertical section through the rollers and table, showing the parts on an enlarged scale; and Figs. 5 and 6 are detail views of one of the water-valves.

My machine includes a suitable pressure-roller and casting-tables. I make use of a plurality of tables 1 in connection with a single roller 2. The tables 1 are mounted upon a suitable carrier 3, which will carry the same in succession into position to coöperate with the roller 2. This carrier is shown as a circular platform built up in any suitable way and provided with radial arms or beams 4, connecting with a hub 5, secured to a central shaft 6, mounted in a stepped bearing 7. The platform is also provided with a suitable number of wheels 8, running on a circular track 9. This platform may be driven or rotated by any suitable mechanism, the drawings showing the same provided with an annular rack 10, which is engaged by the pinion 11 on a power-shaft 12. This shaft may be driven by any suitable mechanism, such as the electric motor 13. The driving mechanism will be arranged so as to rotate the platform 3 intermittently, such as providing the same with a clutch 14, whereby the platform may be started and stopped when desired.

The tables 1 are secured to the platform 3 in any suitable manner so as to be carried around thereby. These tables will be carried into position to be acted on by the roller 2, and the carrier will then be stopped, so that the tables will be stationary while the glass is being rolled onto the same.

The roller 2 is carried by a suitable carriage 16, moving in overhead guides or ways 17, and will be traversed longitudinally of the tables 1 by any suitable mechanism, such as the hydraulic cylinder 18, having its piston-rod 19 connected to the carriage 16. The roller 2 is mounted in suitable hangers 20, depending from the carriage 16, and has its bearings or boxes 21 mounted in slots 22 in said hangers, so that said roller can move vertically to adapt itself to various thicknesses of glass. The roller is held against the glass by its own weight.

The roller is made hollow, as indicated at 23, and to one journal thereof is connected an inlet-pipe 24 and to the opposite journal an outlet-pipe 25 for a suitable cooling medium. The inlet-pipe is provided with a suitable cut-off valve 26.

The tables 1 likewise are so constructed that they can be cooled, being hollow, as indicated at 28. Each table is connected, by means of a pipe 29, to the central shaft 6, the latter being made hollow and having connected thereto the supply-pipe 30, which is provided with a swiveled connecting member, so that cooling medium will at all times be supplied to the hollow shaft 6 and thence through the pipes 29 to the tables. Each table is provided with an outlet-pipe 31, which leads inside of the track 9 and discharges on the floor, the latter being provided with a suitable gutter (not shown) for conducting away the water. It is not necessary that the cooling medium to the tables be supplied during the entire period of their travel with the carrier 3; but it is necessary that said medium be supplied to the tables during the time that the hot glass is being rolled down onto the tables. To regulate the supply of cooling medium to the tables, each of the pipes 29 is provided with a valve 33, which is so constructed that it will automatically close and normally remain closed. As shown in the drawings, each valve is provided with a spring 34 for closing the same. The valve-stem passes down through a stuffing-box and at its lower end carries a roller 36, which is adapted to run up onto a cam-bar 37, located in such position that the valve will be held open during the required period of the travel of the tables. When said roller runs off the end of the cam-bar, the valves will automatically close.

The invention so far described is capable of making all forms of plate, ribbed, and prism glass. For making the former the table and rollers will be provided with smooth faces, while for making ribbed or prism glass the table or roller, or both, will be provided with suitably-ribbed or otherwise-shaped faces.

For making wire-glass means are provided for applying a trellis to the glass. This is accomplished by connecting to the carriage 16 a suitable support having a roll of trellis. As shown in the drawings, the trellis roll 40 is mounted in a suitable box 41 which in turn is carried by hangers 42, depending from the carriage 16. The front end of the table is provided with suitable means for attaching the trellis thereto, such as the clamping-bar 43, which may be operated by any suitable means, such as the cams 44, having operating-handles 45. To maintain a sufficient tension on the trellis, the roll 40 is put under suitable friction, such as by means of a spring 46, bearing on said roll. The trellis passes from the roll and underneath a gage bar or roller 47, which will hold the same the proper distance above the table 1. This gage bar or roller 47 is vertically adjustable, so as to vary the position of the trellis in the glass or adapt the same to glass of various thicknesses. This adjustment may be effected by various means, the drawings showing adjusting-screws 48 of the ordinary type.

The batch of glass is poured on the table 1 in front of the roller 2 and between the same and the box 41. A suitable gun 49 is provided for confining the molten glass. In order to prevent overheating of the box 41, the front wall thereof is made double or hollow, as indicated at 50. The roller 2 runs on suitable guides or strips 52 on the edge of the table 1, and in order to make glass of various thicknesses these guides or strips are removable, as is ordinarily the case. The rear end of the table is provided with a knife 53, which serves to cut off the trellis when the roller passes over the edge of said knife.

The operation of the machine is as follows: The platform 3 is intermittently rotated to carry the tables 1 around in a circular course. When a table approaches the roller 2, the carrier is stopped and a batch of glass is poured onto the table in front of the roller 2. The roller is then traversed by admitting pressure to the cylinder 18, thus rolling the glass down upon the table. The platform 3 is then again rotated, so as to carry this table out of the way and bring the next table into position for receiving the batch of glass. When the roller 2 has been retracted and when the batch of glass is poured onto the said table, the roller is again traversed over the same. In this way the tables are brought in succession into position to be operated on by the roller 2, so that the rolling of the different sheets of glass can take place in very quick succession. The glass is removed from the tables at any convenient point in the travel of the tables 1. By having a series of tables the output of the machine is very largely increased over existing machines.

The roller and tables are kept cool by the means described. The cooling medium is admitted to the tables only during a period slightly longer than the rolling of the glass thereon, this being accomplished by the spring-valve and cam-bar described. When making wire-glass, the trellis is supported in the box in front of the roller 2, and the end of said trellis is clamped to the forward end of the table. The batch is then poured onto the trellis and onto the table, and when the carriage 16 is traversed the roller embeds the trellis in the glass, and as said roller passes over the knife at the rear end of the table the trellis is cut off.

The machine described is capable of forming all characters of rolled glass and of various thicknesses. While I have described a single pressure-roller 2, it is obvious that a plurality of said rollers may be employed.

What I claim is—

1. In a machine for making rolled glass, the combination of a plurality of tables upon which the sheet of glass is to be formed, a carrier for said tables, mechanism for driving said carrier intermittently, a pressure-roller for forming the glass on said tables, and mechanism for traversing said roller over said tables.

2. In a machine for making rolled glass, the combination of a plurality of tables upon which the sheet of glass is to be formed, a circular platform carrying said tables, mechanism for rotating said platform intermittently, a pressure-roller for forming the glass on said tables, and mechanism for traversing said roller over said tables.

3. In a machine for making rolled glass, the combination of a plurality of tables upon which the sheet of glass is to be formed, a carrier for said series of tables, mechanism for moving said carrier intermittently, means for supplying a cooling medium to said tables during a portion of their travel, a pressure-roller for forming the glass on said tables, and mechanism for traversing said roller over said tables.

4. In a machine for making rolled glass, the combination of a plurality of tables upon which the sheet of glass is to be formed, a carrier for said tables, mechanism for moving said carrier intermittently, a pipe for conveying cooling medium to each of said tables, an automatically-closing valve in each of said pipes, means for holding said valves open during a portion of the travel of the tables, a pressure-roller for forming the glass on said tables, and mechanism for traversing said roller over said tables.

5. In a machine for making rolled glass, the combination of a plurality of tables upon which the sheet of glass is to be formed, a carrier for said tables, an overhead way, a pressure-roller mounted in said way, and mechanism for traversing said roller over the tables.

6. In a machine for making rolled glass, the combination of a plurality of tables upon which the sheet of glass is to be formed, a carrier for said tables, mechanism for moving said carrier, an overhead track or ways arranged parallel to the movement of the tables, a carriage mounted in said ways, mechanism for reciprocating said carriage, and a pressure-roller carried by said carriage and arranged to form the glass on the tables.

7. In a machine for making wire-glass, the combination of a plurality of tables upon which the glass is to be formed, means for securing the trellis to the forward end of said tables, a carrier for said tables, mechanism for intermittently moving said carrier, a roller for forming the glass on said tables, a movable carrier for said roll, and a support for the trellis mounted on said carrier.

8. In a machine for making wire-glass, the combination of a forming-table, a pressure-roller coöperating therewith, means for traversing said table and roller relative to each other, means for clamping the trellis to the forward end of the table, a support for the trellis, a guide or gage member under which said trellis passes, said guide being spaced from the roller to permit a batch to be poured between the same and the roller and on top of the trellis, and means for vertically adjusting said guide member.

9. In a machine for making rolled glass, the combination of a forming-table, a pressure-roller coöperating therewith, mechanism for traversing said table and roller relative to each other, means for securing the trellis to the forward end of the table, a support for the trellis, means for applying tension thereto, a guide-roller under which said trellis passes, said guide-roller being spaced in front of the pressure-roller to permit a batch of glass to be poured between the same and said pressure-roller, and means for adjusting said roller vertically.

10. In a machine for making rolled glass, the combination of a forming-table, a pressure-roller, mechanism for traversing said table and roller relative to each other, means for securing the trellis to the forward end of the table, a spool for supporting the trellis, and a box in front of the roller in which said spool is mounted, said box being provided with a hollow or double wall on the side toward the roller.

In testimony whereof I, the said RODERICK W. DAVIES, have hereunto set my hand.

RODERICK W. DAVIES.

Witnesses:
H. F. BANFIELD,
J. W. KREPS.